Figure 1:
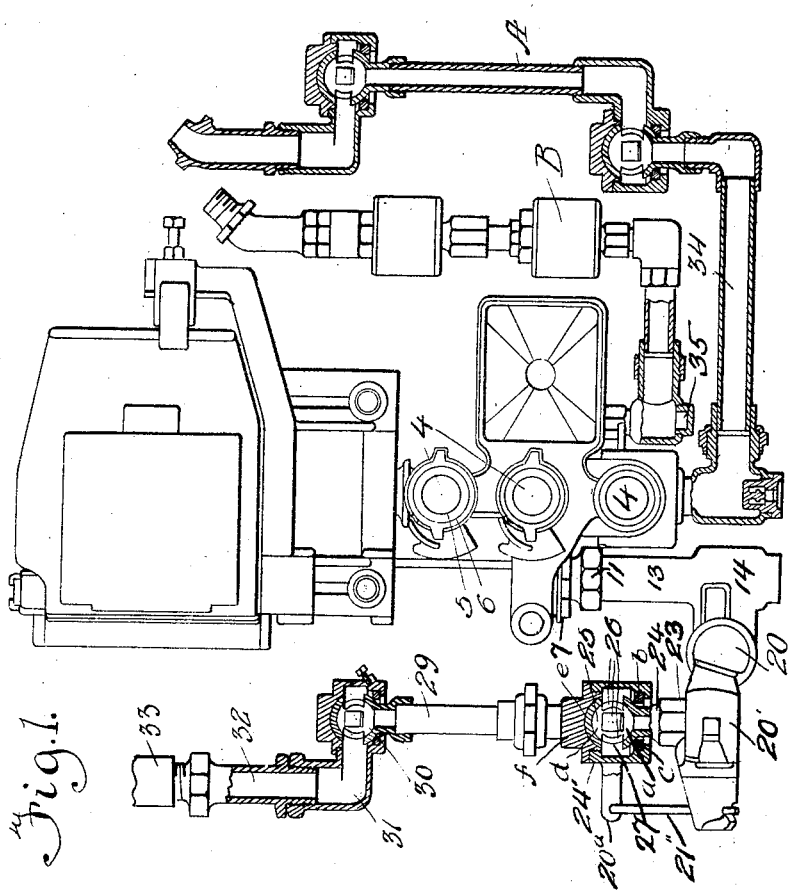

P. BEAHM.
METALLIC CONNECTION FOR AUTOMATIC CONNECTORS FOR TRAIN PIPES.
APPLICATION FILED FEB. 8, 1910.

959,290.

Patented May 24, 1910.
2 SHEETS—SHEET 1.

Witnesses
G. M. Spring
Ralph Healy

Inventor
Peter Beahm
by David D. Moore,
his Attorney

P. BEAHM.
METALLIC CONNECTION FOR AUTOMATIC CONNECTORS FOR TRAIN PIPES.
APPLICATION FILED FEB. 8, 1910.
959,290.
Patented May 24, 1910.
2 SHEETS—SHEET 2.
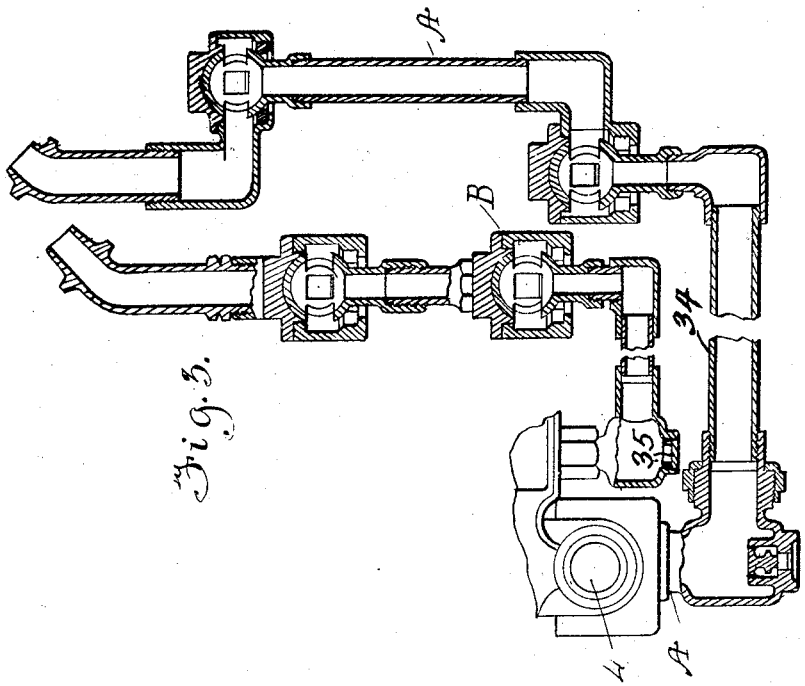
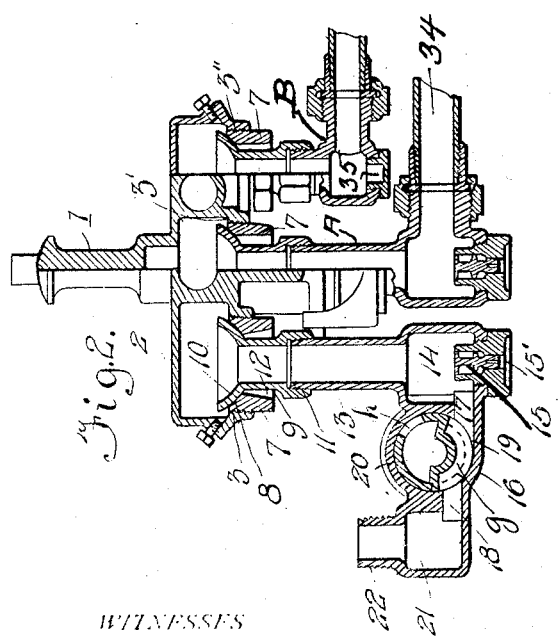
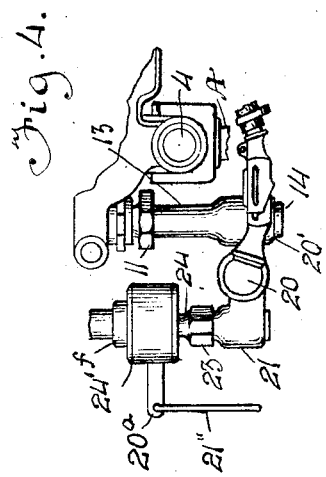
WITNESSES
G. M. Spring
Ralph Healy
INVENTOR
Peter Beahm
by David P. Moore
his Attorney

UNITED STATES PATENT OFFICE.

PETER BEAHM, OF ALTOONA, PENNSYLVANIA, ASSIGNOR OF ONE-THIRD TO CHARLES A. BUCH AND ONE-THIRD TO JAMES P. FORSYTH, OF WAYNE, PENNSYLVANIA.

METALLIC CONNECTION FOR AUTOMATIC CONNECTORS FOR TRAIN-PIPES.

959,290. Specification of Letters Patent. Patented May 24, 1910.

Original application filed January 21, 1910, Serial No. 539,430. Divided and this application filed February 8, 1910. Serial No. 542,687.

*To all whom it may concern:*

Be it known that I, PETER BEAHM, a citizen of the United States, residing at Altoona, in the county of Blair and State of Pennsylvania, have invented certain new and useful Improvements in Metallic Connections for Automatic Connectors for Train-Pipes, of which the following is a specification, reference being had therein to the accompanying drawing.

My present invention relates to improvements in metallic connections for automatic connectors for train pipes, this connection being specially designed for use in connection with my connector as covered by my U. S. Letters Patent No. 872,707, dated December 3rd, 1907, but more particularly upon my connector set forth in my application filed January 21st, 1910, Serial No. 539,430, and of which this application is a division.

The main objection to the automatic connectors for train pipes heretofore presented, resides in the fact that no satisfactory metallic connection or coupling means was provided, whereby the connector itself was connected to the pipes carried by the car, that is the air brake pipes, the air signal pipes and the steam heating pipes, and I have therefore endeavored, and have as far as I am able to figure out, devised a connection, which has all the advantages required of this form of connection, and none of the disadvantages of the others. To produce a connection of this character, it must be of metal, for the reason that all three of the pipes must be simultaneously connected as the cars couple or are about to couple, and for this reason, should they not be metal, the heat from the heating pipes would soon ruin the other pipes. Furthermore all of the connections must be flexible or so joined as to permit of motion between the rigid ends of the pipes carried by the car and those carried by the connector and not to interfere with the proper and non-leaking action of the joints. To this end, I have devised the metallic connection, as presented in the accompanying drawings, in which:—

Figure 1 is an end view of one member of my automatic connector with each one of the pipe connections in section. Fig. 2 is an enlarged detail section of steam pipe connection. Fig. 3 is an enlarged detail section of the air brake pipe connection. Fig. 4 is an enlarged detail view of the valve for connecting the steam heating pipes manually shown in position for manual connection.

Referring to the drawings:—The numeral 1 designates the sliding member of my connector, which has the upper casing portion 2, having the three downwardly opening ports 3, 3' and 3'', and the three alined connector ports 4, each one of which is provided with the metallic abutting rings 5, which themselves are each provided with the series of concentric grooves 6 V-shaped, in section. These grooves permit the abutting rings to meet, and any grit upon the flat portions of the faces will be accommodated within the grooves 6, so that all rings will seat in the same vertical plane, thus insuring a non-leaking metallic joint between the connectors. Threaded into the downwardly opening ports 3, 3' 3'', are the collars 7, whose upper ends are provided with the curved seats 8, terminating in the downward and outwardly flaring bore or channel 9, the purpose of which will presently appear. Fitting within the bore or channel 8, from above and held seated by their own weight and also the pressure upon the seats 8, are the semi-spherical couplings 10, which carry the threaded portion 11 and the reduced portion 12, this reduced portion being opposed to the bore 9, so that the said coupling is allowed a gyratory motion within the bore and upon the seat 8. By this means a tight joint is at all times made with the connector proper.

Connected to the threaded portion 11, so as to be supported by the coupling 10, is a vertical pipe 13, which has formed integral therewith at its lower end the condensation chamber 14, having the valve 15, for controlling the outlet 15; and formed integral and at right angles to the pipe 13, is a connecting casing 16, which is provided with the channels 17 and 18, which are separated by the crosswise slightly tapered bore 19, in which is rotatably mounted the hollow tapered valve 20, the purpose of which will presently appear. Formed integral with the other end of the connecting casing 16, is a casing 21, having the upwardly projecting threaded connection 22, to which is connected the female member 23, of the active member 24, of the ball-and-socket coupling.

This active member 24, consists of hollow ball head 25, provided with a series of outlets 26, through the walls horizontally of the axis of the ball, so that the lower solid portion at $a$, will rest snugly upon the soft metal gasket or valve seat $b$, carried upon the annular rim or flange $c$, of the stationary or other member 24' of the ball-and-socket joint, the upper solid portion $d$, of the ball fitting snugly against and in the concaved portion $e$, in the underside of the removable and adjustable plug or cap $f$, of the member 24'. By this means the heating fluid is permitted to pass through the member 23 through the ball 25, into the channel 27, and rearward through an elbow, which is connected to the vertical pipe 29, whose upper end in turn is connected to the ball-and-socket coupling 30, through the elbow 31, to the vertical coupling 32, which is secured to the heating pipe 33 of the car. By this means it will be seen that the coupling 10, and the heating pipe 33, support the metallic coupling pipes so that as the connector is given a gyratory motion by reason of the movement of the respective ends of the cars, the steam joints are flexible and yet non-leakable, thus producing an efficient connection of this character and for this purpose.

When my automatic connector is connected for automatic operation, the valve 20, assumes the position as shown in Fig. 2, and in this instance the manual pipe coupling or handle 20', is swung to assume the position as shown in Fig. 1, the pivoted link or wire 20'', carried by the arm 20ª, removably engaging the handle 20', and causing the central cut-away portion $g$, of the valve 20 to permit a passageway through the two ports 17 and 18, steam thus passing from either direction through the port of the automatic coupler, but should my connector be coupled manually, the handle 20', is released and swung to assume the position shown in dotted lines Fig. 2, thus causing the port $h$, to aline with the port, 18, closing port 17, and permitting the steam to pass through the port 18, and port $h$, into the hollow portion of the valve 20, and thence through the channel of the handle 20', to the other member of the manual pipe coupler to the car pipes of the car not provided with my connector. This provision is made, in the event that cars not equipped with my automatic connector may be manually connected thereto, and thereby not prohibit the use of either coupler.

In the air-brake coupling, A, I dispense with the casing 16 and its valve 20, employing a horizontal pipe 34 in lieu thereof, as the connector itself is provided with a member at its port 4, for manual connection, while in the air-signal coupling or connection B, no condensation valve is used, a plug 35 being employed, otherwise this connection is the same as the air-brake connection.

By this form of metallic connection, it is evident that I provide a means whereby an automatic connector carrying connectors for air-brake, air-signal and steam heating pipes, may be metallically connected to the respective pipes of the car, in such a manner that the same will not leak, and yet will produce the flexibility required.

What I claim, as new, is:—

1. The combination with a car coupler, an automatic train pipe connector supported entirely thereby, and the pipes of the car, of a pipe connection between the automatic train pipe connector and the pipes of the car, comprising a sleeve having a downwardly flaring channel, a vertical pipe having a semi-spherical upper end fitting in and above the channel, whereby the pressure of the fluid and the weight of the connection will hold the upper end into close contact with the upper end of the flaring channel and said pipe will have a gyratory movement within said channel to accommodate the transverse and tilting movements of the car coupler.

2. The combination with a car coupler, an automatic train pipe connector supported bodily thereby, and the pipes of the car, of a pipe connection between the automatic train pipe connector and the pipes of the car, comprising a sleeve having a downwardly flaring channel and an upper concaved seat, a vertical pipe having a semi-spherical upper end fitting upon the seat and within the channel, and connections between the vertical pipe and the train pipes capable of a gyratory movement.

3. The combination with a car coupler, an automatic train pipe connector supported bodily thereby, and the pipes of the car, of a metallic pipe connection between the automatic train pipe connector and the pipes of the car, comprising a sleeve forming a support at the automatic connector, a vertical pipe supported in said sleeve and capable of a gyratory movement therein, and ball-and-socket connected conduits connecting said vertical pipe and the pipes of the car.

4. The combination with an automatic train pipe connector and the pipes of the car, of a connection between the connector and the heating pipe of the car, comprising a vertical pipe connected to the automatic connector and capable of a gyratory movement with relation thereto, a casing at the lower end of the pipe, a pipe connecting the casing to the pipe of the car, and a valve having a manually operated member, of a pipe coupler mounted in the casing, whereby when the connector is operating automatically, the said valve permits steam to flow into the vertical pipe and through the connector, but when manually connected, switches the flow of steam through the valve itself and prevents it flowing through the connector.

5. The combination with a car coupler, an automatic train pipe connector having a series of connector ports terminating in a series of chambers, said connector being bodily supported by and movable with the car coupler, and the pipes of a car, of a metallic connection between the connector and the train pipes, comprising a sleeve removably mounted in each chamber of the connector and having an upper concaved seat and a tapering bore, a coupling having a semi-spherical upper end projecting downwardly through each of said sleeves and having the said semi-spherical end resting upon the seat of said sleeve, and a universal coupling between each of the said couplings and the train pipes, as set forth.

In testimony whereof I affix my signature in presence of two witnesses.

PETER BEAHM.

Witnesses:
GEORGE BEAHM,
LEWIS MILLER.